United States Patent
Iwamoto et al.

(10) Patent No.: US 7,802,254 B2
(45) Date of Patent: Sep. 21, 2010

(54) JOB EXECUTION SYSTEM AND JOB EXECUTION METHOD, AND JOB EXECUTION APPARATUS AND IMAGE FORMING APPARATUS USED FOR THIS SYSTEM

(75) Inventors: Hiroshi Iwamoto, Toyohashi (JP); Eiichi Yoshida, Toyokawa (JP); Hideki Hino, Toyokawa (JP); Shoji Imaizumi, Shinshiro (JP); Masaaki Saka, Toyokawa (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1331 days.

(21) Appl. No.: 11/011,168

(22) Filed: Dec. 15, 2004

(65) Prior Publication Data

US 2006/0070070 A1    Mar. 30, 2006

(30) Foreign Application Priority Data

Sep. 29, 2004   (JP) .............................. 2004-284844

(51) Int. Cl.
*G06F 9/46* (2006.01)
*G03G 15/00* (2006.01)

(52) U.S. Cl. .......................... 718/100; 399/80; 399/81; 399/82; 718/102

(58) Field of Classification Search ................. 718/100, 718/101, 102, 106; 399/80, 81, 82; 358/1.15
See application file for complete search history.

(56) References Cited

U.S. PATENT DOCUMENTS

| | | | | |
|---|---|---|---|---|
| 5,999,766 A | * | 12/1999 | Hisatomi et al. ............... | 399/80 |
| 6,559,967 B1 | * | 5/2003 | Akiba et al. ................ | 358/1.16 |
| 6,871,243 B2 | * | 3/2005 | Iwase et al. ................... | 710/62 |
| 2002/0105677 A1 | * | 8/2002 | Sato ......................... | 358/1.15 |
| 2004/0012812 A1 | * | 1/2004 | Shimizu .................... | 358/1.15 |
| 2004/0126122 A1 | * | 7/2004 | Kanamoto et al. ........... | 399/20 |
| 2006/0197981 A1 | * | 9/2006 | Honma ...................... | 358/1.15 |

FOREIGN PATENT DOCUMENTS

JP    11-196206    7/1999

(Continued)

OTHER PUBLICATIONS

Notification of Reasons for Refusal dated Apr. 4, 2006 with English language translation.

(Continued)

*Primary Examiner*—Meng-Ai An
*Assistant Examiner*—Willy W Huaracha
(74) *Attorney, Agent, or Firm*—Buchanan Ingersoll & Rooney PC

(57) ABSTRACT

A job execution system comprises a job execution apparatus, an image data storage portion which is installed either outside or inside the job execution apparatus and stores image data in each box, a group information storing portion which is installed either outside or inside the job execution apparatus and stores group information preset for each group to which the user belongs in association with the box, a group information acquisition portion which is installed to the job execution apparatus and acquires the group information associated with the box when the box in which the image data is stored is designated by the user, and a controller which operates the job execution apparatus in conformity to the acquired group information.

21 Claims, 10 Drawing Sheets

FOREIGN PATENT DOCUMENTS

| | | |
|---|---|---|
| JP | 2001-306204 | 11/2001 |
| JP | 2002-202870 | 7/2002 |
| JP | 2003-067249 | 3/2003 |
| JP | 2004-186960 | 7/2004 |
| JP | 2004186960 A * | 7/2004 |
| JP | 2004-235799 | 8/2004 |

OTHER PUBLICATIONS

U.S. Appl. No. 10/763,281, filed Jan. 26, 2004, copy attached.

* cited by examiner

| Box ID | Group ID | Password | Output setting information |
|--------|----------|----------|----------------------------|
| Box 1  | Group 1  | 00001    | A                          |
| Box 2  | Group 1  | 00002    | a                          |
| Box 3  | Group 2  | 00001    | B                          |
| Box 4  | Group 2  | 00002    | b                          |
| Box 5  | Group 3  | 00001    | C                          |
| Box 6  | Group 3  | 00002    | C                          |
| Box 7  | Group 3  | 00003    | C                          |
FIG.7
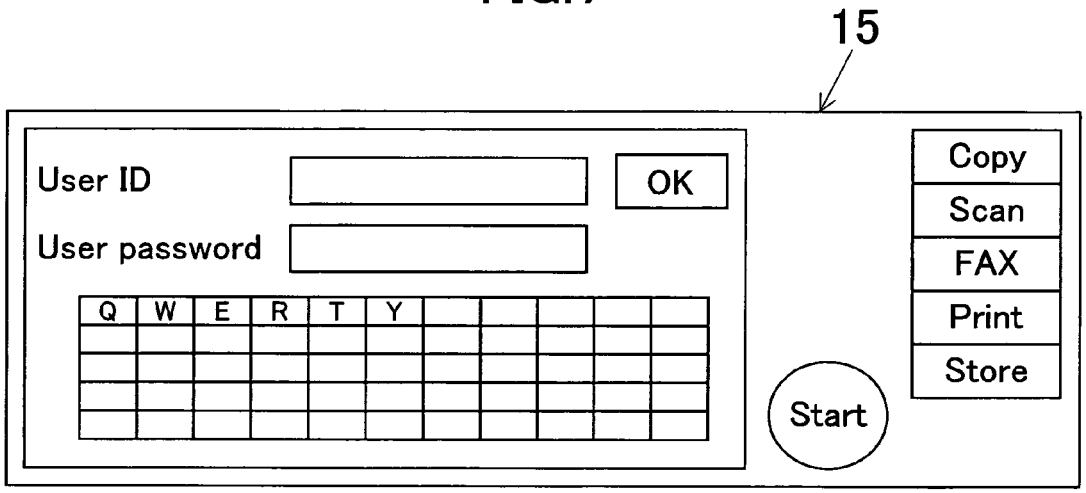
FIG.8
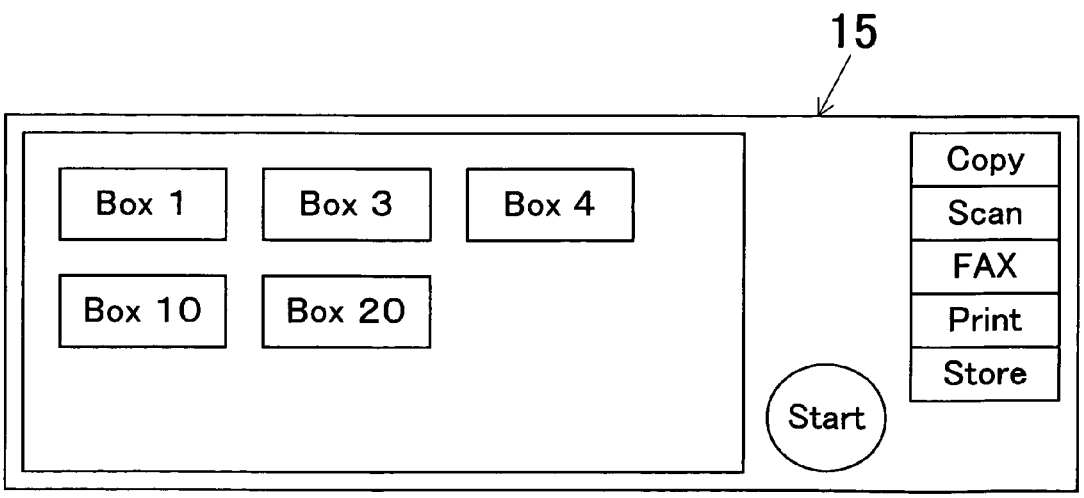
FIG.9

JOB EXECUTION SYSTEM AND JOB EXECUTION METHOD, AND JOB EXECUTION APPARATUS AND IMAGE FORMING APPARATUS USED FOR THIS SYSTEM

This application claims priority under 35 U.S.C. §119 to Japanese Patent Application No. P2004-284844 filed on Sep. 29, 2004, the entire disclosure of which is incorporated herein by reference in its entirety.

BACKGROUND OF THE INVENTION

1. Field of the Invention

The present invention relates to a job execution system and job execution method equipped with a job execution apparatus such as an image forming apparatus and others, and a job execution apparatus as well as an image forming apparatus used for this system.

2. Description of Related Art

The following description sets forth the inventor's knowledge of related art and problems therein and should not be construed as an admission of knowledge in the prior art.

In a job execution apparatus equipped with a box function, for example, MFP (Multi Function Peripherals), etc., which is a multifunctional image forming apparatus, boxes in which image data is stored are frequently controlled in accord with groups or outputted under the setting conditions of the group which controls the boxes when the image data is outputted. Consequently, calls for operating the job execution apparatus by linking the box to the information of the group which controls the box have been increased.

Hitherto, as stipulated in Japanese Unexamined Patent Publication No. 2003-67249, there known are techniques that enable the setting of access right in group units for the image data such as document data and others stored in each stored point.

However, in the technique stipulated in Japanese Unexamined Patent Publication No. 2003-67249, access in group units is enabled for the image data, but in order to output the image data under the setting conditions of a control group of the box in which the image data is stored, the user must enter output conditions individually, causing a problem of troublesome work.

In addition, when the user accesses the image data, the user might be required for authentication of the affiliated group together with his/her own authentication, but in such event, the user must enter the authentication information of the group together with his/her own authentication information, and troublesome operation results.

That is, there is a problem that the technique is unable to respond to the requests because of insufficient linkage of the box with the information on the group which controls the box in view of the operation of the job execution apparatus.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a job execution system that can operate the job execution apparatus while achieving sufficient linkage of the box in which the image data is stored with the information of the group that controls the box.

Among other potential advantages, some embodiments can provide a job execution apparatus used for the system.

Among other potential advantages, some embodiments can provide an image forming apparatus used as the job execution apparatus.

Among other potential advantages, some embodiments can provide a job execution method that can operate the job execution apparatus while achieving sufficient linkage of the box in which the image data is stored with the information of the group that control the box.

According to a first aspect of a preferred embodiment of the present invention, a job execution system, comprises:

a job execution apparatus;

an image data storage portion which is installed either outside or inside of a job execution apparatus and stores an image data in each box;

a group information storing portion which is installed either outside or inside the job execution apparatus and stores group information preset for each group to which a user belongs in association with the box;

a group information acquisition portion which is installed to the job execution apparatus and acquires the group information associated with the box when the box in which the image data is stored is designated by the user; and a controller which operates the job execution apparatus in conformity to the acquired group information.

According to a second aspect of a preferred embodiment of the present invention, a job execution apparatus, comprises:

a job execution portion;

an image data storing portion which stores an image data in each box;

a group information storing portion which stores group information preset for each group to which a user belongs in association with the box;

a group information acquiring portion which acquires the group information associated with the box when the box in which the image data is stored by the user; and a controller which operates the job execution portion in conformity with the acquired group information.

According to a third aspect of a preferred embodiment of the present invention, an image forming apparatus, comprises:

a job execution portion comprising at least any of a print portion, an e-mail transmitting portion, or a facsimile transmitting portion;

an image data storing portion which stores an image data in each box;

a group information storing portion preset for each group to which a user belongs in association with the box;

a group information acquiring portion which acquires group information associated with the box when the box in which the image data is stored is designated by the user; and a controller which operates the job execution portion in conformity to the acquired group information.

According to a fourth aspect of a preferred embodiment of the present invention, a job execution method, comprises steps of:

storing group information preset for each group to which a user belongs in a storing portion in association with a box;

acquiring the group information associated with a designated box from the storing portion when the box in which an image data is stored is designated by the user; and operating a job execution portion comprising at least any of a print portion, an e-mail transmission portion, or a facsimile transmission portion in conformity to the acquired group information.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 7 is a control table which associates the box with the group;

FIG. 8 is a user authentication screen displayed on an operation panel in the processing to output the image data by the use of the acquired group information;

FIG. 9 is a box display screen displayed on the operation panel;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
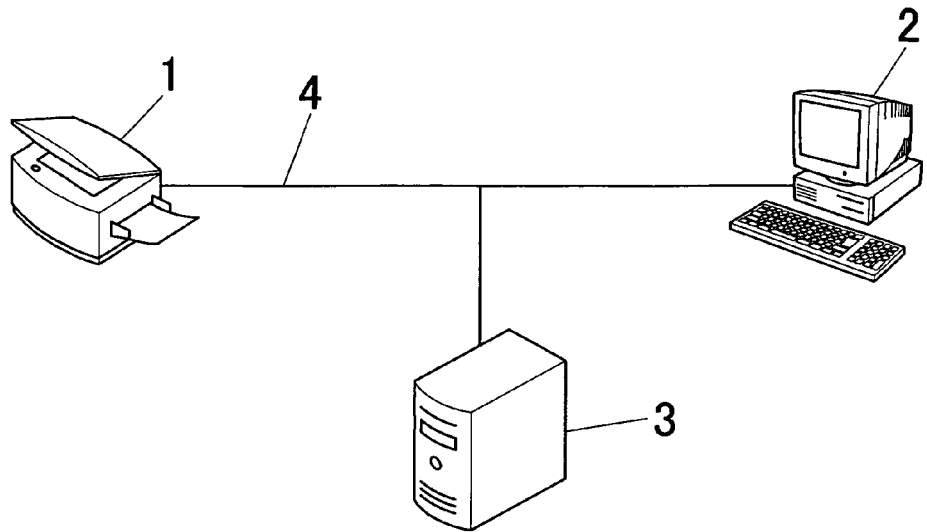
FIG. 1 is a configuration diagram of an embodiment of the job execution system according to the present invention.

FIG. 1 is a configuration diagram of an embodiment of the job execution system according to the present invention.

This job execution system is equipped with MFP1, an image forming apparatus as a job execution apparatus, user terminal 2 comprising a personal computer, etc., and authentication server 3, and these MFP1, user terminal 2, and authentication server 3 are connected via network 4.

Figure 2:
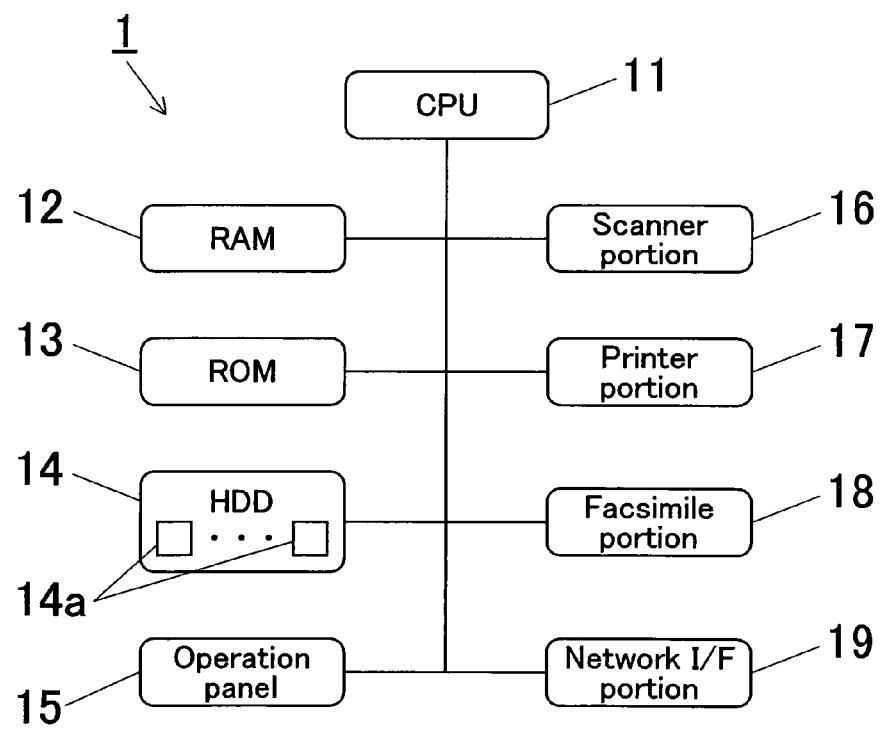
FIG. 2 is a block diagram illustrating the electrical configuration of the MFP in the job execution system.

FIG. 2 is a block diagram illustrating the electrical configuration of the MFP1.

In FIG. 2, the MFP1 is equipped with CPU11, RAM12, ROM13, storage 14, operation panel 15, scanner portion 16, printer portion 17, facsimile (FAX) portion 18, network interface (network I/F) portion 19, and others.

The CPU11 operates as a controller, and has the following functions in this embodiment in addition to comprehensively controlling the whole MFP1. That is, when a box later discussed is designated by the user, CPU11 acquires the group information associated with the box, controls to operate MFP1 in conformity to the group information, or transmits an authentication request to authentication server 3 to execute the authentication. Furthermore, CPU11 has a display control function that causes the display unit of operation panel 15 and user terminal 2 to display the content of the box or group information. These will be discussed in detail later.

The RAM 12 temporarily stores the necessary data and image data when CPU11 executes a program, and in addition, the ROM13 stores operation programs of CPU11 and others.

The storage portion 14 stores the image data readably, and in this embodiment, nonvolatile storage unit, harddisk (HDD), is used. This storage portion 14 is equipped with a plurality of boxes 14a which is a directory to store the image data and its storing time and date as an image data file. This box is controlled in accord with groups to which the user belongs and the user of each group is allowed to access the box controlled.

The storage portion 14 stores a box (for example, box 1 through box 7) 14a in association with the group information as shown in FIG. 7. Specifically, in this embodiment, the storage portion stores the box in association with ID of the group which controls the box and the group password in association with the output setting information.

The group information are parameters and others when MFP1 is operated with respect to the data (image data) called from the box, and as shown in FIG. 7 discussed above, group ID, group password, output setting information, etc. are included. Needless to say, the group information shall not be limited to these.

Examples of the output setting information include print setting information when the image data is printed by MFP1, transmission setting information in the case of e-mail transmission, transmission setting information in the case of facsimile transmission, and others.

Examples of the print setting information include the type of papers prescribed by groups, paper size, designated paper feed port, number of copies printed, single side/double sides, finishing setting such as presence or absence of staples, punches, and others.

Examples of the e-mail transmission setting information include header information, format of report, and others when e-mail is transmitted with the image data as an attached file.

Examples of the facsimile setting information include destination number prescribed by the group, presence of invoice, format, and others.

The operation panel 15 works as a user I/F in which the user carries out various entry operations for MPI or which displays the output conditions and others for the user, and has various operating keys such as a mode setting key, start button, ten-keys, and others and a touch-panel type display portion comprising LCD and others. The user uses this operation panel 15 to enter identification information for authentication such as a password, user ID, and others or carries out operations such as selecting a designated box from boxes 14a displayed on the display portion. By the way, display of boxes and selection of boxes can be carried out by the user terminal 2 which has a display unit.

The scanner portion 16 carries out processing to read images from the original placed on a document rest and others and output as the image data.

The printer portion 17 prints the image data and functions as one of the job execution portion.

The facsimile portion 18 transfers and receives the image data to and from a counterpart facsimile apparatus and functions as one of the job execution portion.

The network interface portion 19 establishes network protocol between the user terminal 2 and the authentication server 3 via the network 4 such as ETHERNET and others or carries out page description language processing at the time of printing. This network interface portion 19 also functions as the job execution portion when the image data is transmitted to the transmission destination by the use of e-mail, FTP transmission, and others.

The authentication server 3 carries out user authentication to decide whether the user is permitted to use the MFP1 or group authentication to decide whether the group is permitted to use the MPF1, and returns the authentication result to the MFP1.

In the job execution system of the above configuration, the image data read by the scanner portion of the MFP1 or transmitted from the user terminal 2 is stored in the boxes 14a according to the group to which the user belongs. When the user wants to output (for example, print) the image data stored in boxes 14a, the user designates the boxes 14a in which the image data is stored, and the group information related to the designated boxes 14a is indicated as shown in FIG. 7. The CPU11 of the MFP1 acquires the group information in this way and at the same time operates the MFP in conformity to the acquired group information.

Consequently, the user no longer needs to enter the setting conditions for each group or the information and others for authentication and the improved operability is achieved.

Figure 3:
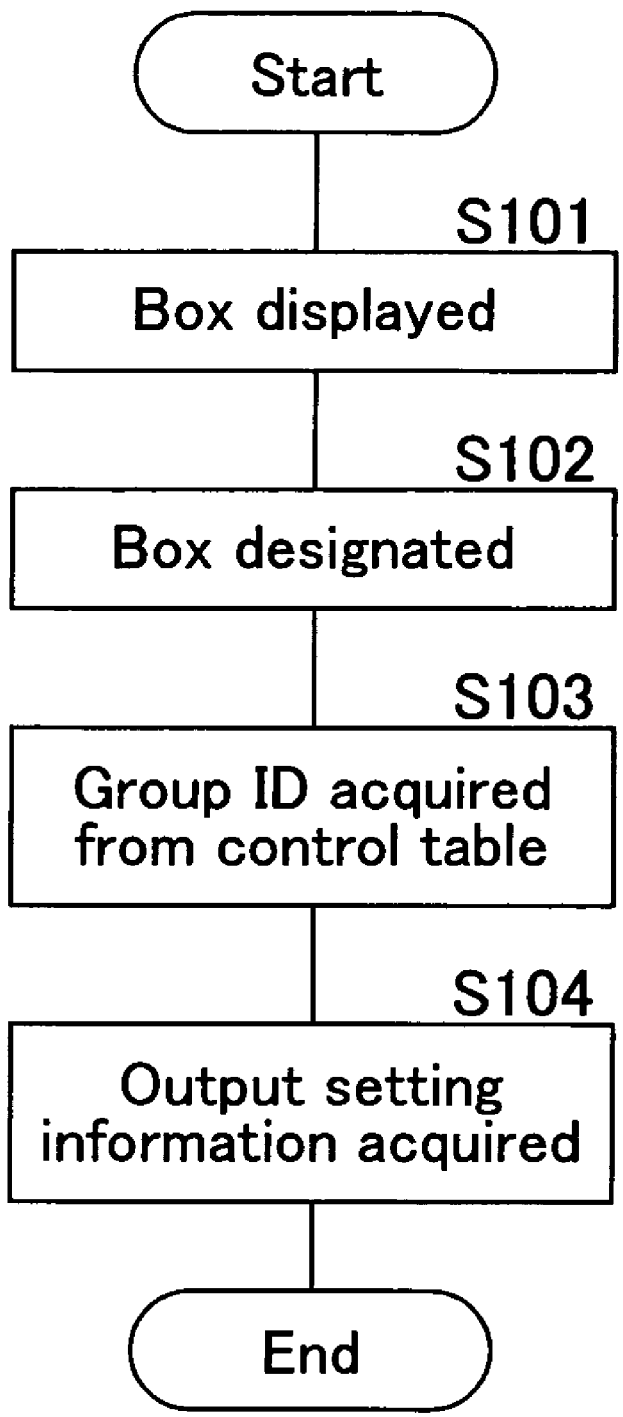
FIG. 3 is a flow chart illustrating the processing which CPU of the MFP carries out when the group information related to the box is acquired when the user uses the image data stored in the box.

Next description is made on the processing which the CPU11 of the MFP1 carries out when the output setting information associated with boxes 14a which stores the image data is obtained in reference to the flow chart shown in FIG. 3. In the following description and drawings, the step is abbreviated to S.

In FIG. 3, first of all, the box which the user designates is identified. That is, in S101, boxes 14a is displayed on the operation panel 15 of MFP1, and the box desired by the user is designated from the boxes displayed; then in S102, the CPU11 accepts this box designation and by this, the box designated by the user is identified. The box may be identified not by designating the box from the displayed boxes but by entering box ID.

In S103, group ID that corresponds to the designated box is acquired from the control table shown in FIG. 7 and then, in S104, the output setting information stored in the storage portion 14 which corresponds to the group ID is acquired and the procedure is ended.

Figure 4:
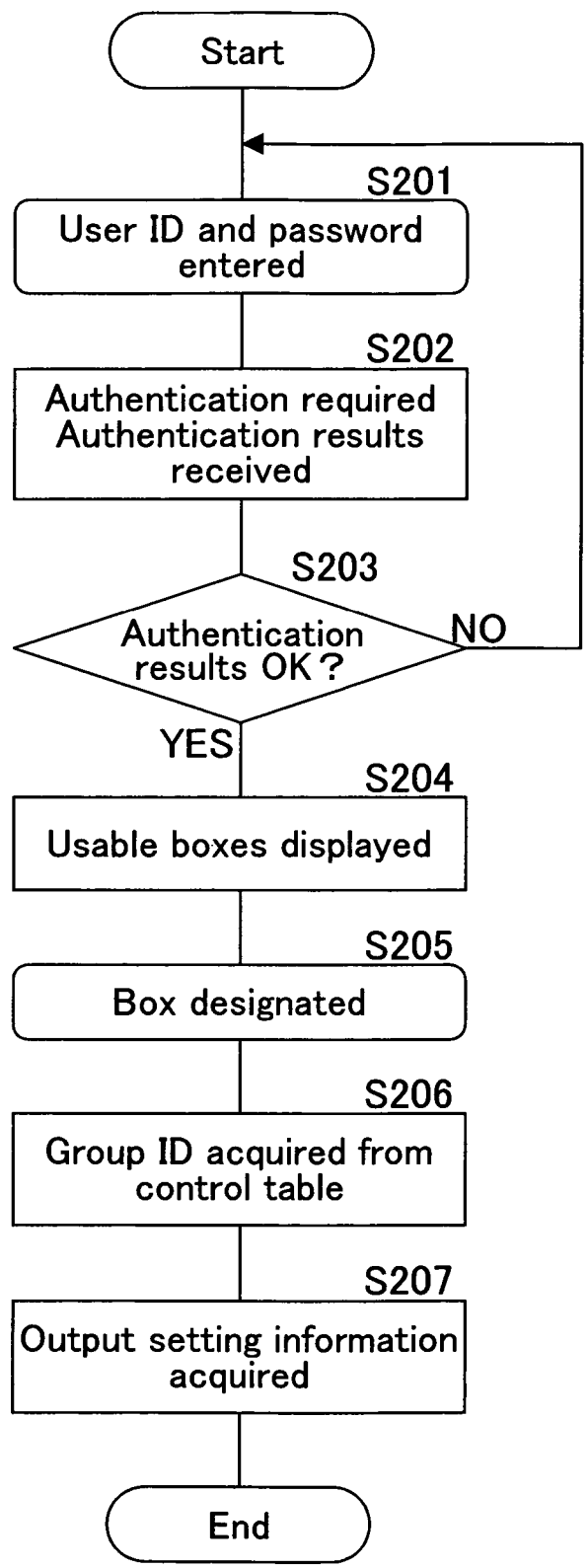
FIG. 4 is a flow chart illustrating the processing which the CPU of the MFP carries out when the group information is acquired by carrying out user authentication when the user utilizes the image data stored in the box.

FIG. 4 is a flow chart illustrating the processing which the CPU11 of the MFP1 carries out when the output setting information is acquired after user authentication in the event the user uses the image data stored in the box 14a.

In FIG. 4, when the user enters user ID and password as identification information for the user authentication in S201, the CPU11 accepts the entry. The user ID and others are entered on the user authentication screen of FIG. 8 displayed on the operation panel 15.

In S202, authentication is requested to the authentication server 3 and the authentication result is received from the authentication server 3. By this authentication processing, security is established.

In S203, whether authentication is established (OK) or not is judged and if the authentication is established (YES for the judgment in the S203) in S204, a box display screen of FIG. 9 with available boxes displayed is displayed on the operation panel 15. If the authentication is not established (NO for the judgment in the S203), the processing returns to S201 and entry of the user ID and the password is requested again.

When the user designates a box to carry out the output of the image data of the stored image data from the displayed boxes (box 1, 3, 4, 10, 20) in S205, the CPU11 accepts this entry and, in S206, acquires the group ID related to the designated boxes 14a in reference to the control table shown in FIG. 7. And in S207, the output setting information stored in the storage portion 14 in correspondence to the group ID is acquired and the processing is ended.

Figure 5:
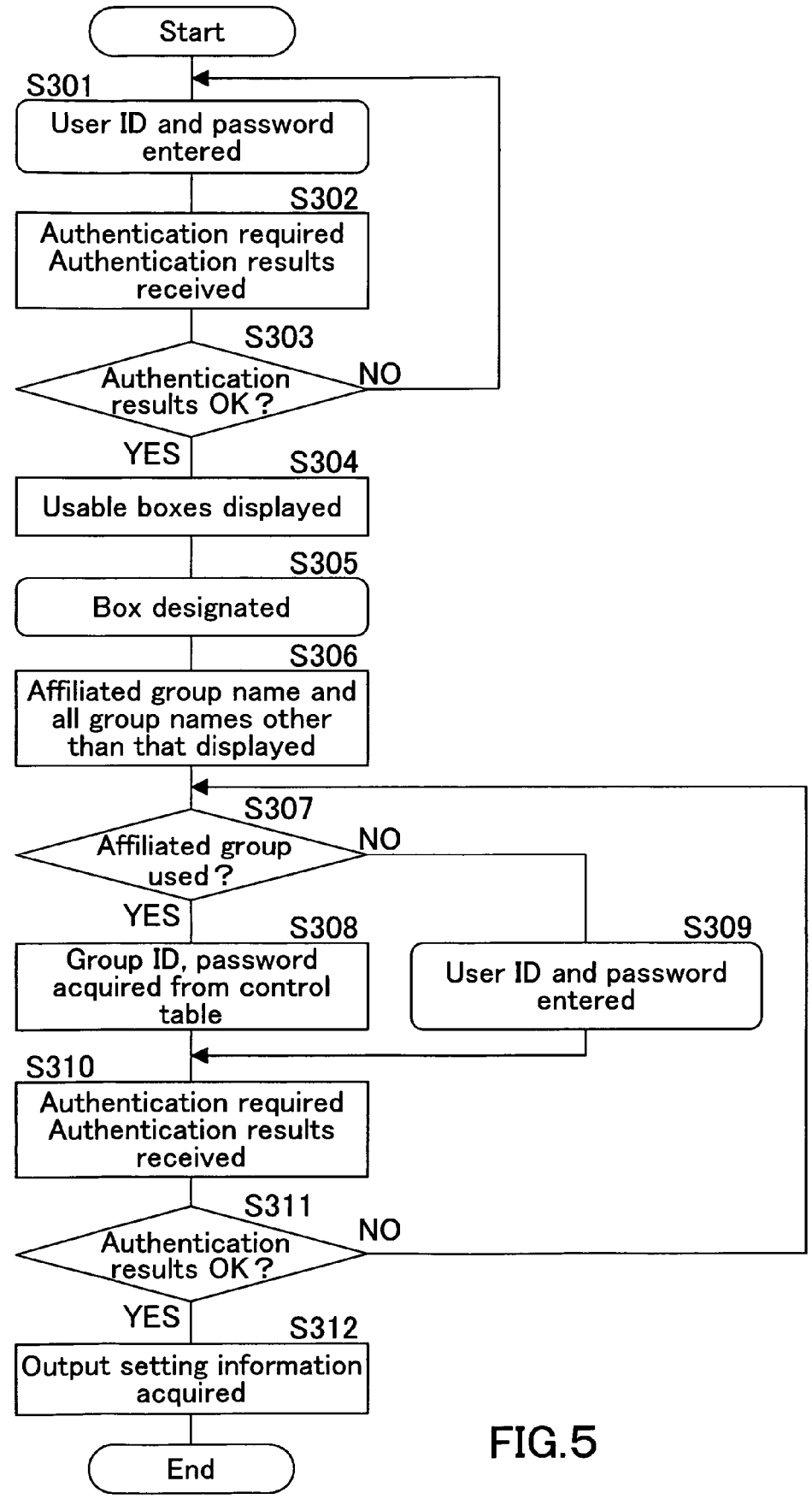
FIG. 5 is a flow chart illustrating the processing which the CPU of the MFP carries out when the group information is acquired after the authentication of the group to which the user belong is carried out together with the user authentication when the user utilizes the image data stored in the box.

FIG. 5 is a flow chart illustrating the processing which the CPU11 of the MFP1 carries out when the output setting is acquired after the user affiliated group is authenticated together with the user authentication when the user uses the image data stored in the boxes 14a.

In FIG. 5, when the user enters the user ID and the password as the identification information for user authentication in S301, the CPU11 accepts the entry. The user ID and others are entered on the user authentication screen of FIG. 9 displayed on the operation panel 15.

In S302, the authentication request is made to the authentication server 3 and the authentication result is received. Then, in S303, whether the authentication is established (OK) or not is judged and if the authentication is established (YES for judgment in the S303), the available boxes are displayed on the box display screen (FIG. 9) of the operation panel 15. If authentication is not established (NO for judgment in the S303), processing returns to the S301 and entry of the user ID and the password is requested.

Figure 10:
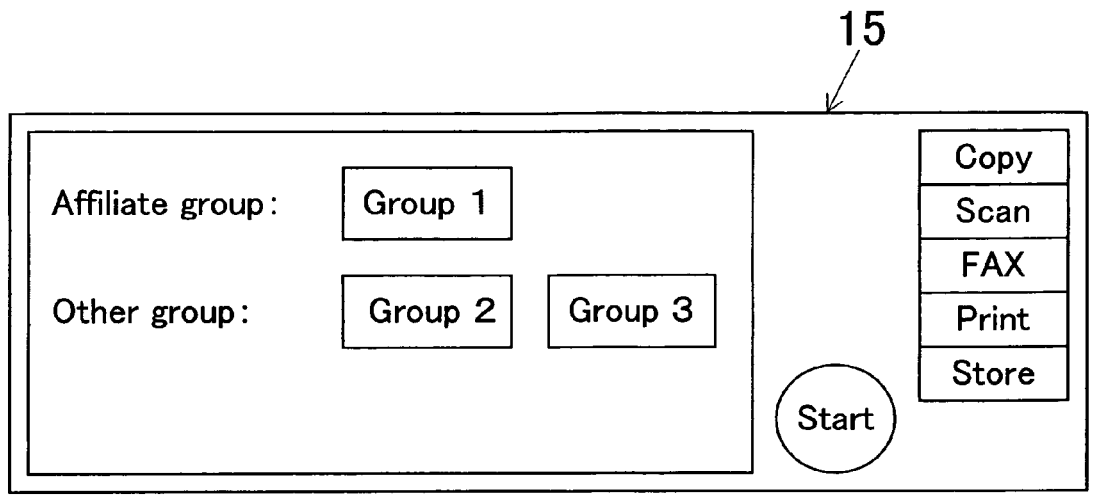
FIG. 10 is a group display screen displayed on the operation panel.

When the user designates a box for outputting the stored image data from the displayed boxes (box 1, 3, 4, 10, 20) in S305, the CPU11 accepts this and then, displays the group display screen of FIG. 10 on the operation panel 15 in S306 in order to grasp whether the group information of the user affiliated group is used or the group information other than the user affiliated group is used, and a user affiliated group name and all other group names are displayed here.

When the user designates a group in S307, the CPU11 judges whether or not the user uses the group information of the affiliated group (whether the user designated the affiliated group). If the user uses the group information of the affiliated group (YES for judgment in S307) in S308, the CPU11 acquires the group identification information (the group ID and the password in this case) for the group authentication from the control table of FIG. 7 and moves to S310.

If the user does not use the group information of the affiliated group (NO for judgment in the S307), the CPU11 requests the entry of the identification information of the group the user uses in S309 and when the user enters the group identification information (the password and the group ID), the CPU11 accepts this and moves to S310.

In the S310, the CPU11 requests authentication for the authentication server 3 and receives the authentication result from the authentication server 3.

And in S311, the CPU 11 judges whether or not the authentication has been established (OK) from the group authentication result, and if the authentication is not established (NO for judgment in the S311), CPU11 returns to the S307 and requests again the designation of the group and entry of identification information (the group identification ID and the password ID).

When authentication is established (YES for judgment in the S311), the CPU11 acquires the corresponding output setting information in S312 and ends the processing.

Referring now to the flow chart of FIG. 6, description will be made on processing which the CPU11 of the MFP1 carries out when the output setting information is acquired by the flow charts of FIGS. 3, 4, and 5 above.

In this step, as one example of output processing (job execution processing), e-mail (shown as E-Mail in the drawing) transmission processing will be discussed. The e-mail transmission processing means the processing to transmit the image data stored in boxes 14*a* to the transmission destination via the network 4 as the attached data to the e-mail.

When e-mail is transmitted, the output information such as e-mail address of the user which is the transmission destination, title, and others are set, but in this embodiment, the e-mail address is set by the use of the acquired output setting information.

Figure 6:
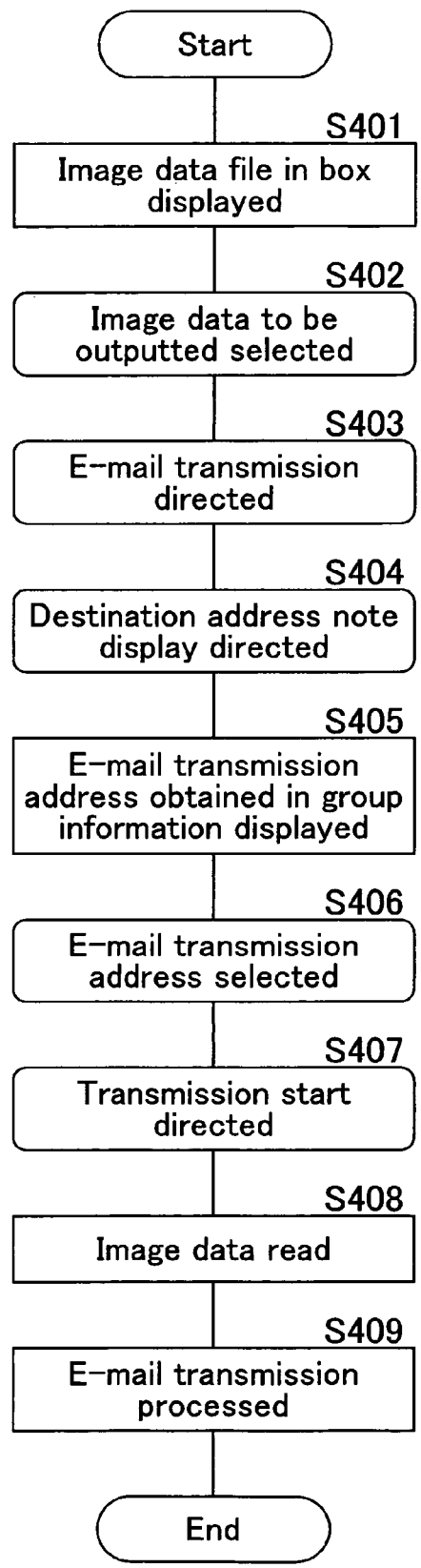
FIG. 6 is a flow chart illustrating the processing which the CPU of the MFP carries out when the image data is outputted by the use of this information after the group information is acquired.
Figure 11:
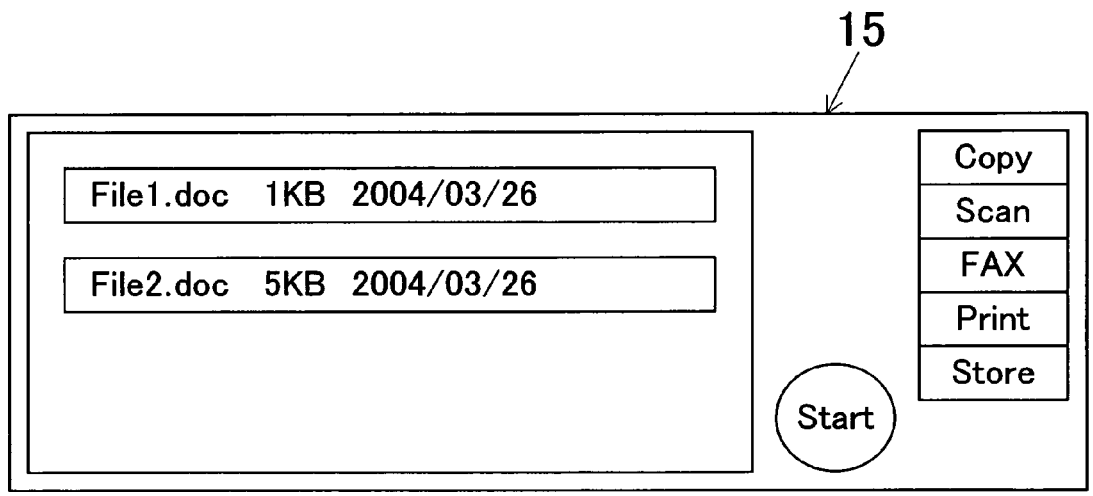
FIG. 11 is an image data file display screen displayed on the operation panel.

In FIG. 6, the CPU11 of the MFP1 displays the image data file stored in the designated boxes 14*a* on the data file screen (FIG. 11) of the operation panel 15 in S401.

In S402, when the user selects the image data to be e-mail transmitted from the image data file, the CPU11 accepts this, and in S403, the CPU11 accepts the e-mail transmission instruction by the user. The e-mail transmission instruction by the user is carried out by touch-entering the "e-mail" button displayed on the output selection screen (FIG. 12) of the operation panel 15.

Figure 13:
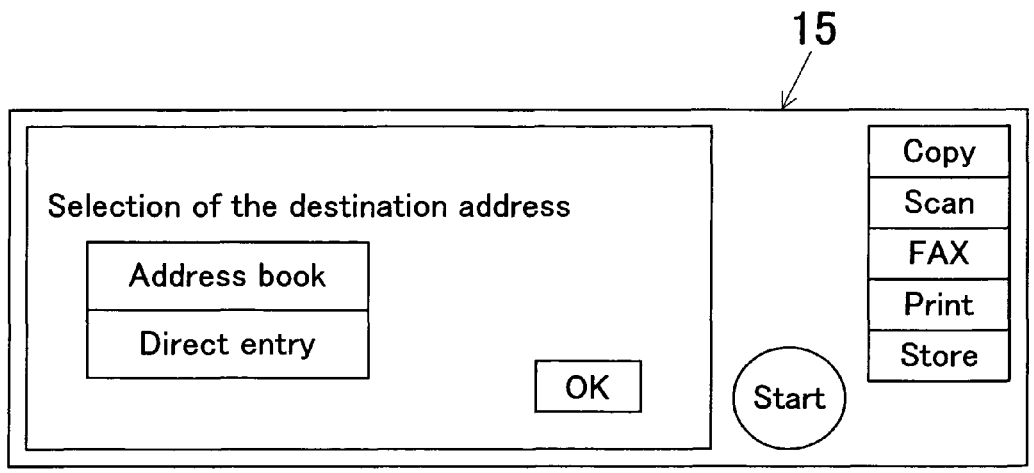
FIG. 13 is a destination selection screen displayed on the operation panel.
Figure 14:
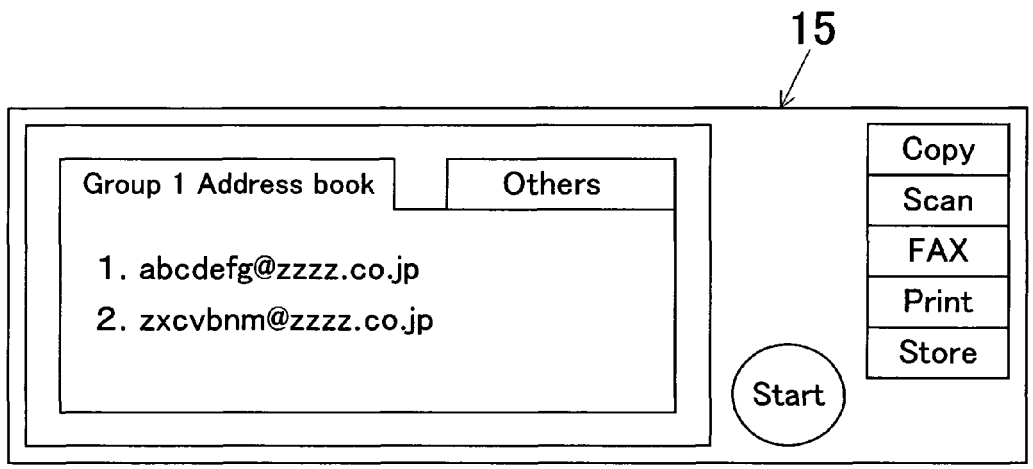
FIG. 14 is an address book screen of the group displayed on the operation panel.

Then, in order to set the user e-mail address, which is the transmission destination, a destination selection screen (FIG. 13) is displayed on the operation panel 15 of the MFP1. In S404, when the user presses the "address book" selection button, the CPU11 accepts this, and displays the e-mail address acquired from the output setting information on the operation panel 15 as the group address book screen (FIG. 14) in S405.

In S406, when the user selects the destination from the e-mail address of the displayed destination or enters directly the address, the CPU11 accepts this and sets the destination. In S407, when the user gives the transmission start instruction after entering the setting header information and text information for transmission, the CPU11 accepts the instruction.

And in S408, the CPU11 reads the image data designated by the user from the boxes 14*a*, carries out e-mail transmission processing of the read image data, and ends the processing in S409.

In this way, because the e-mail address is set by the use of the acquired output setting information when e-mail transmission processing is carried out, the address setting operation by the user becomes extremely simple.

Figure 12:
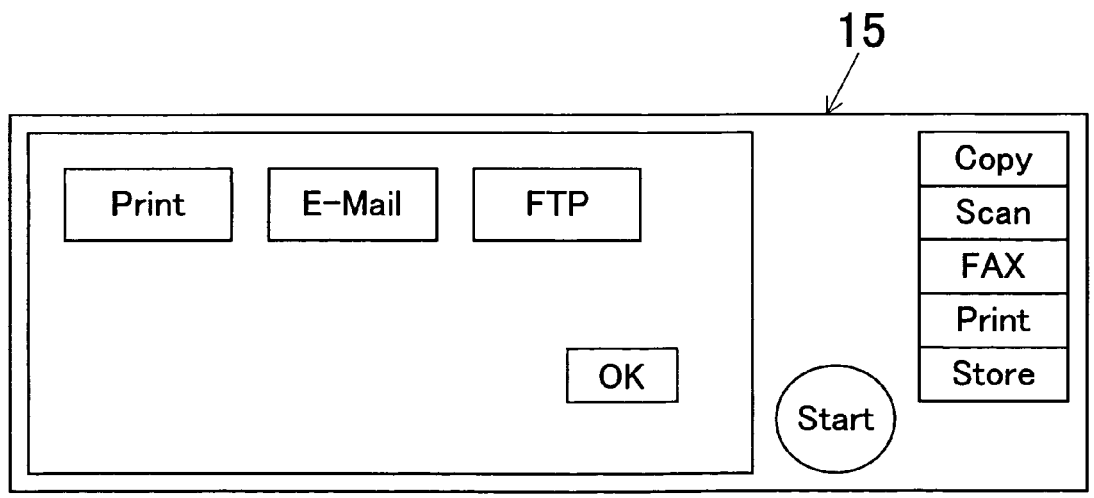
FIG. 12 is an output type selection screen displayed on the operation panel.

In the flow chart of FIG. 6, explanation is made with processing of transmitting the image data stored in the boxes 14*a* as the attached data of the e-mail to the destination on the network 4 taken as an example, but when the image data is file-transferred by the FTP (File Transfer Protocol), "FTP" only is selected on the output type selection screen shown in FIG. 12. In such event, the destination selection screen shown in FIG. 15 is displayed.

Figure 15:
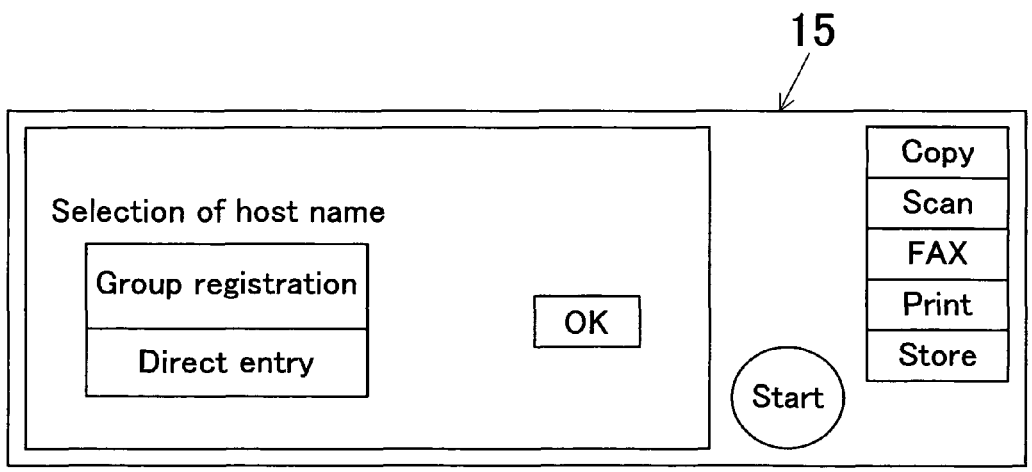
FIG. 15 is a destination selection screen displayed on the operation panel in the processing to FTP-transmit the image data by the use of the group information.

For the FTP transmission, host name, destination folder name, password, and others are required, and for part or all of these pieces of information, the output setting information associated with the boxes 14*a* is used, and as a result, the destination selection screen and others shown in FIG. 15 are displayed. In this case, the screen on which "host name" is selected is shown.

Figure 16:
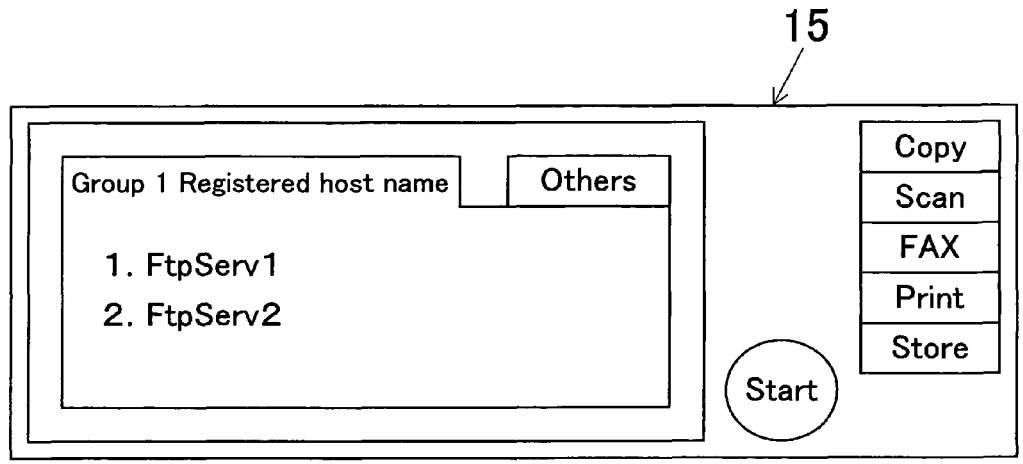
FIG. 16 is a registered host name screen of a group is played on the operation panel.

In addition, in the destination selection screen shown in FIG. 15, selecting the "group registration" button changes the screen to registration host name screen of the group associated with the selected boxes 14*a* as shown in FIG. 16. The user selects the host name from those displayed.

Figure 17:
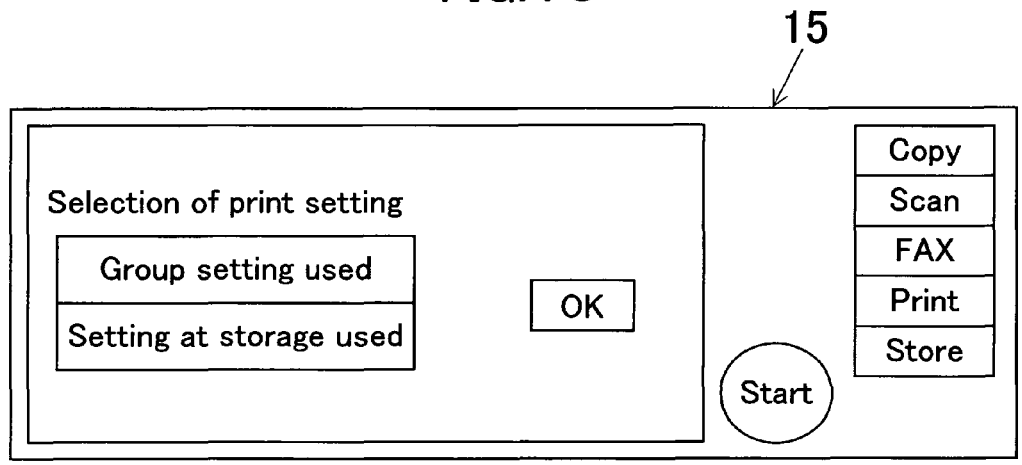
FIG. 17 is a print setting selection screen displayed on the operation panel in the processing to print the image data by the use of the group information.

Furthermore, when the image data is printed, all we have to do is to select the "print" button on the output type selection screen shown in FIG. 12, and in such event, the print setting selection screen shown in FIG. 17 is displayed.

On this print setting selection screen, it is allowed to select whether "group setting used" (output setting is carried out by the setting registered by the group) or "setting at the storage used" (output setting is carried out by the setting at the time of storing the image data).

Figure 18:
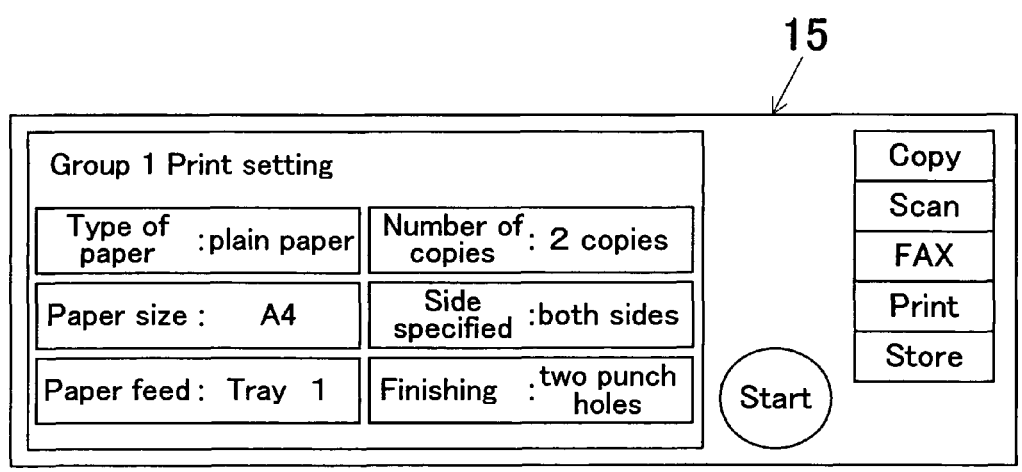
FIG. 18 is the print setting screen of a group displayed on the operation panel.

In the event that the user selects the "group setting used" on the print setting selection screen in FIG. 17, the screen changes to the group print setting screen shown in FIG. 18, and the print setting information which is the output setting information preset for each group is displayed, and jobs can be outputted in conformity to this print setting information.

Examples for the print setting information includes the type of papers, paper size, paper feed port designation, number of copies, one side/both side designation, finishing setting such as presence of staple and punch holes and others, and each setting content is displayed.

Depressing the start key begins printing. In addition, when part of setting is changed, touching the setting key to be changed can change the setting.

Figure 19:
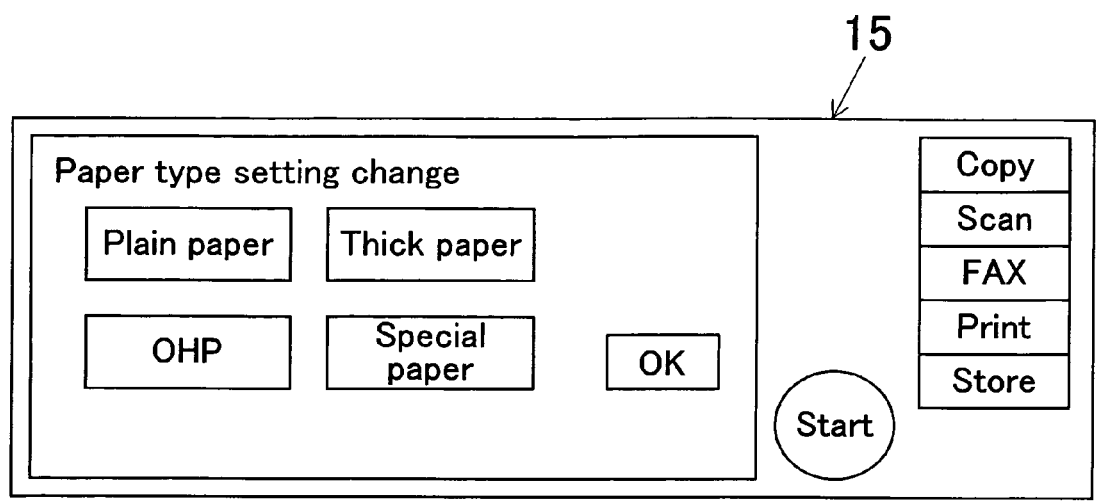
FIG. 19 is a paper type setting change screen displayed on the operation panel.

For example, depressing the "type of papers" shown on the group print setting screen in FIG. 18 causes the screen to change to the "paper type setting change" screen of FIG. 19, and paper types (plain paper, thick paper, OHP, and special paper) can be changed.

Although the invention has been described in one preferred embodiment, it is understood that the present invention is not limited to the above-mentioned embodiment.

For example, in the storage portion 14, the boxes 14a is formed and at the same time the group information is stored, but the box and the group information may be formed or stored in separate storage portions. In addition, a box may be formed in a storage portion outside MFP1 or the group information may be stored in the storage portion outside MFP1.

Furthermore, the authentication server 3 is provided to carry out authentication outside MFP1, but the authentication portion may be provided inside MFP1.

In addition, the user information entry screen, the box display screen, the group display screen, and other various screens are displayed on the operation panel 15 of the MFP1, but they may be displayed on the display unit of the user terminal 2 and the user may operate them from the user terminal 2.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A job execution system, comprising:
   a job execution apparatus equipped with a job execution portion comprising at least any of a print portion, e-mail transmitting portion, or facsimile transmitting portion;
   an image data storage portion including a plurality of boxes and which is installed either outside or inside of the job execution apparatus and stores an image data in each of the plurality of boxes;
   a group information storing portion which is installed either outside or inside the job execution apparatus and stores group information preset for each group wherein the group information for the group that controls a respective box is stored in association with the respective box, wherein the group information includes output setting information;
   a group information acquisition portion which is installed to the job execution apparatus and acquires the group information associated with one of the boxes when the one box in which the image data is stored is designated by the user; and
   a controller which operates the job execution apparatus using the output setting information of the acquired group information and wherein the controller operates the job execution portion in conformity to the acquired group information with respect to the image data stored in the box and designated by the user.

2. The job execution system as recited in claim 1, wherein the group information is at least any of print setting information when the job execution portion is the print portion, transmission setting information when the job execution portion is the e-mail transmission portion, or transmission setting information when the job execution portion is the facsimile transmission portion.

3. The job execution system as recited in claim 1, wherein an authentication portion which authenticates the user who uses the job execution apparatus is provided outside or inside the job execution apparatus.

4. The job execution system as recited in claim 3, wherein the controller allows a display unit of an operation panel of the job execution apparatus or a display unit of a user terminal to display boxes which a user-authenticated user can designate.

5. The job execution system as recited in claim 3, wherein the group information is group identification information, and the controller allows the authentication portion to authenticate a user group of the job execution apparatus in conformity with the group identification information.

6. The job execution system as recited in claim 1, wherein the controller can operate the job execution apparatus in conformity to group information other than the group information associated with the box.

7. The job execution system as recited in claim 1, wherein the controller allows the operation panel of the job execution apparatus or a display unit of a user terminal to display the acquired group information.

8. A job execution apparatus, comprising:
   a job execution portion comprising at least any of a print portion, e-mail transmitting portion, or facsimile transmitting portion;
   an image data storing portion including a plurality of boxes which stores an image data in each of the plurality of boxes;
   the group information storing portion which stores group information preset for each group wherein the group information for the group that controls a respective box is stored in association with the respective box, wherein the group information includes output setting information;

a group information acquiring portion which acquires the group information associated with one of the boxes when the one box in which the image data is stored by the user; and a controller which operates the job execution portion using the output setting information of the acquired group information and wherein the controller operates the job execution portion in conformity to the acquired group information with respect to the image data stored in the box and designated by the user.

9. The job execution apparatus as recited in claim 8, wherein the job execution apparatus further comprises the authentication portion which authenticates the user who uses the job execution apparatus.

10. The job execution apparatus as recited in claim 8, wherein the user who uses the job execution apparatus is authenticated by the authentication portion installed outside.

11. The job execution apparatus as recited in claim 9, wherein the controller allows the operation panel of the job execution apparatus or the display unit of the user terminal to display boxes which the user-authenticated user can designate.

12. The job execution apparatus as recited in claim 10, wherein the controller allows the operation panel of the job execution apparatus or a display unit of the user terminal to display boxes which the user-authenticated user can designate.

13. The job execution apparatus as recited in claim 9, wherein the group information is job identification information, and the controller allows the authentication portion to authenticate the user group of the job execution apparatus in conformity with the group identification information.

14. The job execution apparatus as recited in claim 10, wherein the group information is group identification information, and the controller allows the authentication portion to authenticate the user group of the job execution apparatus in conformity with the group identification information.

15. An image forming apparatus, comprising:

a job execution portion comprising at least any of a print portion, e-mail transmitting portion, or facsimile transmitting portion;

an image data storing portion including a plurality of boxes which stores an image data in each of the plurality of boxes;

a group information storing portion preset for each group wherein the group information for the group that controls a respective box is stored in association with the respective box, wherein the group information includes output setting information;

a group information acquiring portion which acquires group information associated with one of the boxes when the one box in which the image data is stored is designated by the user; and a controller which operates the job execution portion using the output setting information of the acquired group information and wherein the controller operates the job execution portion in conformity to the acquired group information with respect to the image data stored in the box and designated by the user.

16. The image forming apparatus as recited in claim 15, wherein the group information is any of the print setting information when the job execution portion is the print portion, the transmission setting information when the job execution portion is the e-mail transmission portion, or the transmission setting information when the job execution portion is the facsimile transmission portion.

17. The image forming apparatus as recited in claim 15, wherein the image forming apparatus further comprises an authentication portion which authenticates the user who uses the image forming apparatus.

18. The image forming apparatus as recited in claim 15, wherein the user who uses the image forming apparatus is authenticated by the authentication portion mounted outside.

19. A job execution method using a job execution apparatus, comprising steps of:

storing group information preset for each group for a particular group to which a user belongs in a storing portion in association with a box that is controlled by the particular group, wherein the group information includes output setting information;

acquiring the group information associated with a designated box from the storing portion when the designated box in which an image data is stored is designated by the user; and operating a job execution portion, by a controller, using the output setting information of the acquired group information, wherein the operating of the job execution portion is in conformity to the acquired group information with respect to the image data stored in the box and designated by the user, and wherein the job execution portion further comprises at least any of a print portion, e-mail transmitting portion, or facsimile transmitting portion.

20. The job execution method as recited in claim 19, wherein the group information is any of the print setting information when the job execution portion is the print portion, the transmission setting information when the job execution portion is the e-mail transmission portion, or the transmission setting information when the job execution portion is the facsimile transmission portion.

21. The job execution method as recited in claim 19, wherein the job execution method further comprises a step for authenticating the user who uses the group information.

* * * * *